April 28, 1964
J. HOVORKA
3,130,546
ROTARY INTERNAL COMBUSTION ENGINE
Filed Aug. 15, 1961
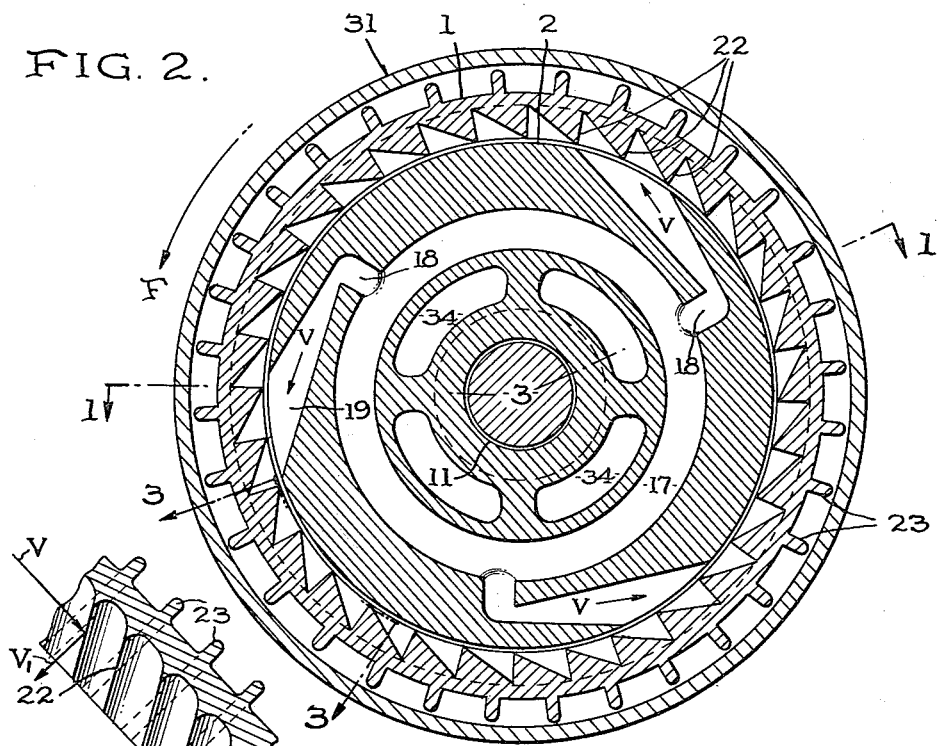
FIG. 2.
FIG. 3.
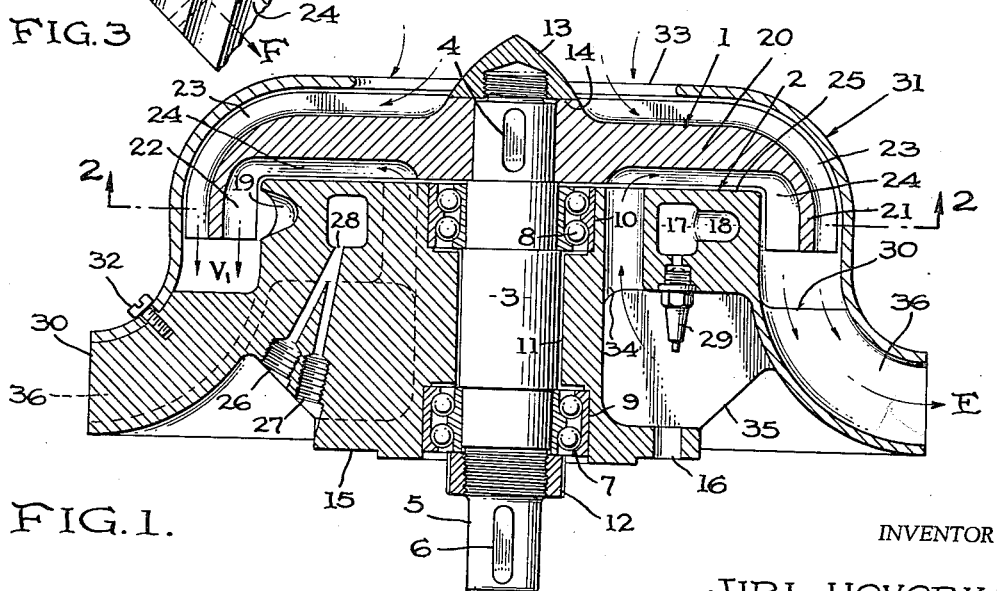
FIG. 1.
INVENTOR
JIRI HOVORKA
BY
ATTORNEY

# United States Patent Office 3,130,546
Patented Apr. 28, 1964

3,130,546
ROTARY INTERNAL COMBUSTION ENGINE
Jiri Hovorka, Morris Plains, N.J., assignor, by direct and mesne assignments, of ninety percent to Royalty Holding Corporation, Morris Plains, N.J., a corporation of New Jersey, and ten percent to Joseph Abelow, Miami Beach, Fla.
Filed Aug. 15, 1961, Ser. No. 131,520
3 Claims. (Cl. 60—39.36)

The present invention relates to a rotary internal combustion engine.

A primary object of the invention is to provide a rotary engine which is highly simplified and compact in construction and adapted to a wide variety of commercial applications, particularly those embodying relatively low horse power requirements, such as outboard motors, power mowers, small garden tractors, portable pumps, auxiliary electrical generators and the like.

Another object of the invention is to provide a rotary internal combustion engine which possesses many of the advantages of a turbine while maintaining the characteristics of vane and/or piston type rotary engines, while being greatly simplified as to structure and numbers of moving parts as compared to conventional rotary internal combustion engines.

Another object of the invention is to provide a rotary internal combustion engine which may be completely air cooled, both internally and externally, without the need for any accessory blower or fan type unit, and in which sealing of the combustion gases is not required and only the main shaft bearings require lubrication.

Another object is to provide a rotary engine of the mentioned character which is adapted to operate efficiently with a wide variety of fuels including conventional hydrocarbon fuels, gaseous fuels, liquid or solid type rocket propellants and the like.

Other objects of the invention include low weight, simplified operating characteristics, the very minimum of maintenance, low production cost, small unit size, versatility of use and low operating cost in an engine which exhibits positive static and dynamic balance.

Other objects and advantages of the invention will be apparent during the course of the following detailed description.

In the acompanying drawings forming a part of this application and in which like numerals are employed to designate like parts throughout the same, FIGURE 1 is a central vertical longitudinal section through a rotary internal combustion engine embodying the invention, taken substantially on line 1—1 of FIGURE 2, FIGURE 2 is a horizontal transverse cross section taken substantially on line 2—2 of FIGURE 1, FIGURE 3 is a fragmentary vertical section taken on line 3—3 of FIGURE 2.

In the drawings, wherein for the purpose of illustration is shown a preferred embodiment of the invention, the numeral 1 designates generally a thrust converter or rotor forming a first main element of the engine, the numeral 2 designating a block or stator, and the numeral 3 the engine main shaft which is keyed centrally to the rotor as at 4 for rotation therewith and having an integral power take-off extension 5 with key means 6 for attachment to the desired driven instrumentality.

The shaft 3 is journaled for free rotation within the block or stator 2, centrally or axially thereof by means of a pair of main bearings 7 and 8, housed within suitable recesses 9 and 10 formed in the opposite ends of the engine block in axial alignment with each other and the reduced shaft bore 11 of the block. A shaft nut 12 on the main shaft 3 engages the inner race of bearing 7, while a tapered end nut 13 on the opposite end of the main shaft engages a shoulder 14 on the rotor 1 to thus maintain the parts in proper assembled relation. The block or stator 2 has a radial mounting flange 15 at its end remote from the rotor 1 for rigidly mounting the engine to any desired frame or relatively stationary structural member of a desired instrumentality, and the flange 15 is provided with suitable opening means 16 to receive bolts or the like.

As shown in the drawings, the engine stator 2 has a single built-in annular combustion chamber 17 concentric with the axis of the shaft 3 and spaced outwardly therefrom a considerable distance and one or more radial combustion chamber cavities 18 leading therefrom and communicating directly therewith and formed within the wall of the generally annular stator in circumferentially equidistantly spaced relation, as shown. A corresponding number of substantially tangential outwardly flaring conically tapered nozzles 19 formed in the annular wall of stator 2 lead from the cavities 18 and open through the periphery of the stator at circumferentially equidistantly spaced points, FIGURE 2. The annular combustion chamber 17 is therefore common to the several cavities 18 and tangential flared nozzles 19.

As shown in the drawings, the rotor 1 or thrust converter comprises a relatively heavy radial plate-like body portion 20 having flywheel characteristics during operation and a marginal integral axially extending wall or skirt 21 of reduced thickness surrounding the stator 2 and spaced therefrom radially, FIGURE 1.

The rotor 1 is provided inwardly of its skirt 21 with a multiplicity of circumferentially equidistantly spaced substantially radial thrust receiving surfaces 22 of equal area, formed by recessing the bore of the rotor as shown in the drawings. These surfaces 22 are adapted to receive directly the high velocity streams of gases expanding through the flared nozzles 19 of the stator to convert the thrust forces or impulses of the same into rotary motion during the operation of the engine. In this connection, it is emphasized that the thrust developed by the high velocity gases passing from the nozzles 19 provides the total working energy for the engine, and the engine operation does in no sense attempt to utilize combustion pressure in the chamber 17, cavities 18 or within the pockets adjacent the surfaces 22 as the working force on the rotor. The operation of the engine depends entirely upon the thrust impulse of the high velocity streams of gases expelled through the several nozzles 19 and against the working surfaces 22 to drive the rotor and the main shaft 3. The high velocity of the gases results from their expansion in the tapered tangential nozzles 19 after combustion takes place in the annular chamber 17 and the radial combustion cavities 18, which form parts of the common combustion chamber.

The rotor 1 is further provided exteriorly with a multiplicity of circumferentially equidistantly spaced air cooling fins 23 which parallel the portions 20 and 21 of the rotor, and a like number of internal radial cooling fins 24 are formed upon the rotor 1 inwardly of the thrust receiving surfaces 22 and adjacent the end face 25 of stator 2, FIGURE 1.

As shown primarily in FIGURE 1, a suitable fuel inlet passage means 26 and a companion air inlet passage means 27 are formed generally axially within the stator 2 in converging communicating relation radially beyond the main shaft 3 and opening directly into the annular combustion chamber 17, as at 28, to supply the proper mixture of fuel and air to the engine. The conventional igniting device such as a spark plug 29 is mounted upon the stator 2 in communication with the annular combustion chamber 17 to ignite the air-fuel mixture therein. Any conventional means of metering the fuel and air to the combustion chamber 17 and controlling the air-fuel ratio may be employed. For the purpose of understanding the operation of the engine, it may be assumed that a suitable source of compressed air, not shown, is connected with the air inlet 27 and a suitable source of liquid or gaseous fuel under pressure is connected with the fuel inlet opening 26. The spark plug 29 may be connected to any one of several conventional electrical ignition circuits, for example, an automotive type direct current battery, high tension coil and vibrator to continuously make and break the ignition circuit.

Exhaust deflectors 30 are disposed at circumferentially spaced intervals around the stator 2 and formed integral therewith serving the dual purposes of directing exhaust gases radially away from the engine and as mounting bosses for an engine cover or cowling 31 which surrounds the rotor 1 in close proximity and conforming to the shape thereof, FIGURE 1. The cowling 31 is detachably secured to the stator by means of screws 32 or the like having screw-threaded engagement with the elements 30 at a number of points around the circumference of the cowling. The cowling 31 has a central cooling air intake opening 33 surrounding the nut 6 and disposed directly opposite the body portion 20 of the rotor and in direct communication with the spaces between the external cooling fins 23.

The engine stator 2 has internal axially extending air cooling passages 34 formed therethrough radially inwardly of the annular combustion chamber 17 and close to the same and communicating directly with the radial passages between adjacent internal cooling fins 24 of the rotor. The space between the cowling 31 and the rotor 1 and between the successive external cooling fins 23 constitutes a substantially continuous annular external air cooling passageway for the engine. Similarly, the space between the rotor 1 and the engine block or stator 2 and between the successive internal fins 24 constitutes a substantially continuous annular internal air cooling passageway for the engine. Reinforcing ribs 35 formed upon the stator 2 in circumferentially spaced relation serve to strengthen the stator between the mounting flange 15 and the annular common exhaust manifold 36 which is also integral with the stator, FIGURE 1.

The operation of the engine is as follows:

Compressed air and the desired liquid or gaseous fuel are metered in proper ratio through their respective inlet passages 27 and 26 into common annular combustion chamber 17, where combustion is initiated by spark plug 29. The resulting combustion gases in the annular chamber 17 expand into combustion chamber cavities 18 and from there into the flared tangential nozzles 19. Expansion of the combustion gases continues in the nozzles 19, imparting to these gases a very high velocity. As the high velocity gases exit from each flared nozzle 19, they impinge upon the thrust receiving surfaces 22 of rotor 1, thereby providing the necessary thrust impulse to turn the rotor and the main shaft 3 to which the rotor is keyed.

Referring to FIGURE 3, the thrust receiving surfaces 22 are at a specific angle to the direction of the high velocity gases discharging from the flared nozzles in direction V, and this angle deflects the gases in a predetermined direction V1, causing them to be diverted into common annular exhaust manifold 36. The thrust produced collectively on the surfaces 14 of the rotor by the high velocity gases creates a resultant force in the direction F which in turn causes the thrust converter or rotor 1 and shaft 3 to which it is keyed to rotate as a unit relative to the fixed stator 2. This rotation continues as long as combustion of fuel continues in the annular chamber 17 to produce continually the high velocity streams of gases in the several nozzles 19.

During rotation, the external cooling fins 23 function as a centrifugal blower to bring in cooling air through the opening 33 and through the previously described external air cooling passageway around the rotor 1. Similarly, internal cooling fins 24 on the rotor serve the same purpose in drawing air into the internal cooling passages 34 of the stator and radially outwardly through the previously described internal cooling passageway between the rotor and stator. The external and internal cooling passageways on opposite sides of the rotor 1 both discharge their cooling air directly into the common exhaust manifold 36, thereby cooling the exhaust gases as they pass out into the atmosphere and thereby purging the engine of exhaust gases. By this means, efficient air cooling is provided for the entire engine and no liquid cooling for either the stator or rotor need be provided.

Any suitable gear reduction unit, not shown, may be integrated into the assembly or secured to the mounting flange 15 so that the desired high torque may be produced by rotation of the shaft 3.

FIGURE 1 shows the separate passages 26 and 27 in the stator generally axially thereof for introducing proper amounts of fuel and air into the combustion chamber 17. However, without effecting the basic principle or design of the engine materially, a conventional air-fuel injector may readily be utilized to inject the fuel mixture into the combustion chamber 17. Another equally suitable modification within the scope of the invention is to replace the fuel and air intakes 26 and 27 with means for mounting a replaceable rocket-type solid propellant charge or charges upon the stator 2, which would in effect constitute an extension of the common combustion chamber 17. In this version of the engine, the spark plug 13 would be eliminated and conventional means for igniting the solid propellant charge or charges would be substituted.

As concerns ignition, a conventional glow plug circuit could readily be substituted for the spark plug ignition circuit. Another alternative, particularly in standby applications where compressed air and pressurized gaseous fuel are supplied from sources independent of the engine, is that the electrical ignition circuit could be eliminated entirely and a pilot flame arrangement substituted therefore.

None of these minor design modifications above-described changes the basic principles, fundamental design or functional operation of the engine as described and illustrated herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A rotary internal combustion engine comprising a stator having an internal annular combustion chamber and a plurality of generally tangential flared nozzle passages leading from said chamber and opening through the periphery of the stator, said stator having an axial through bore inwardly of the chamber and substantially concentric therewith, said stator having circumferentially spaced air cooling through passages axially thereof intermediate said bore and chamber, said stator having generally axial communicating fuel and combustion air inlet opening means formed therein leading to and communicating with said combustion chamber, frictionless bearing means within said stator through bore near opposite ends thereof, a shaft journaled within said bearing means and extending axially beyond opposite ends of the stator, a plate-like rotor secured to one end of said shaft adjacent one end face of the stator, said rotor and said end face being substantially flat, said rotor having a relatively short axially extending annular skirt on the periphery thereof arranged in radially opposed relation to the periphery of the stator, said skirt provided in its inner face with a multiplicity of circumferentially spaced thrust-receiving pockets including generally radial walls and adapted to receive high velocity streams of combustion gases discharging from said nozzle passages to cause rotation of the rotor and said shaft, said plate-like rotor provided on opposite sides thereof with generally radially extending integral cooling fins serving also as blower elements and provided upon the exterior of said annular skirt with cooling fin portions constituting extensions of the fins on the exterior side of said rotor, a generally bell-shaped cowling secured to said stator near the margins of the cowling and stator and substantially surrounding the rotor and conforming generally to the shape thereof and having a large central axial air inlet opening opposite the exterior side of said plate-like rotor and adjacent the exterior fins of said rotor, exhaust passage means on said stator communicating with the interior of said cowling, and means on said stator to initiate combustion within said chamber, rotation of the rotor during engine operation causing said fins on said rotor to draw cooling air in one axial direction through the large central opening of the cowling and in the opposite axial direction through said air cooling passages of the stator, said cooling air on both sides of said rotor discharging from said annular skirt of the rotor into said exhaust passage means to thereby cool the engine and aid in scavenging the exhaust gases.

2. A rotary internal combustion engine comprising an axially narrow generally annular stator having an internal annular combustion chamber and a plurality of circumferentially spaced nozzle passages opening through the periphery thereof and communicating with said chamber, fuel, combustion air supply and ignition means on said stator, said stator having an axial through bore centrally thereof and axial air cooling through passages intermediate said bore and chamber, a shaft extending through and journaled for rotation within said bore, an axially narrow plate-like rotor secured to one end only of said shaft to turn therewith and arranged opposite one end face of said stator, said stator end face being substantially flat and parallel to the plate-like rotor, said stator having a marginal axially extending relatively short skirt portion surrounding the periphery of the stator in close proximity thereto and having interior circumferentially spaced pockets adapted to receive combustion gases from said nozzle passages to cause rotation of the rotor and shaft, generally radial fins on the opposite sides of the plate-like rotor and on the exterior side of said skirt portion, a cowling secured to the stator in surrounding relation to said rotor and having a frontal air intake opening opposite to the exterior side of the rotor, and exhaust port means on said stator communicating with the interior of said cowling and leading axially and radially from the terminal end of said skirt portion of the rotor.

3. The invention as defined by claim 2, and wherein said nozzle passages include inner cavities extending radially from the combustion chamber and generally tangential outwardly flaring portions leading from said cavities to the periphery of the rotor, said rotor pockets being generally V-shaped and including substantially radial walls arranged substantially in opposition to the flared portions of said nozzle passages, said nozzle passages being generally L-shaped from said combustion chamber through the periphery of the rotor.

References Cited in the file of this patent

UNITED STATES PATENTS

| | | |
|---|---|---|
| 494,782 | Jewell | Apr. 4, 1893 |
| 1,133,058 | Paturel et al. | Mar. 23, 1915 |
| 1,319,752 | Brown | Oct. 28, 1919 |
| 1,677,198 | Naileigh | July 17, 1928 |